(12) United States Patent
Suveren et al.

(10) Patent No.: US 12,195,173 B2
(45) Date of Patent: Jan. 14, 2025

(54) LANDING GEAR

(71) Applicant: TUSAS-TURK HAVACILIK VE UZAY SANAYII ANONIM SIRKETI, Ankara (TR)

(72) Inventors: Sercan Suveren, Ankara (TR); Burak Akgun, Ankara (TR)

(73) Assignee: TUSAS-TURK HAVACILIK VE UZAY SANAYIIANONIM SIRKETI, Ankara (TR)

( * ) Notice: Subject to any disclaimer, the term of this patent is extended or adjusted under 35 U.S.C. 154(b) by 0 days.

(21) Appl. No.: 18/282,596

(22) PCT Filed: Apr. 20, 2022

(86) PCT No.: PCT/TR2022/050347
§ 371 (c)(1),
(2) Date: Sep. 18, 2023

(87) PCT Pub. No.: WO2022/225494
PCT Pub. Date: Oct. 27, 2022

(65) Prior Publication Data
US 2024/0166342 A1    May 23, 2024

(30) Foreign Application Priority Data
Apr. 22, 2021 (TR) .............. 2021/006972

(51) Int. Cl.
*B64C 25/60* (2006.01)
(52) U.S. Cl.
CPC ................ *B64C 25/60* (2013.01)

(58) Field of Classification Search
CPC ........ B64C 25/60; F04B 53/16; F04B 53/168; F04B 53/22; F02F 1/004; F16J 10/04
See application file for complete search history.

(56) References Cited

U.S. PATENT DOCUMENTS 2,156,117 A * 4/1939 Johnson ............. B64C 25/60
267/64.15
2,241,068 A * 5/1941 Johnson ............. B64C 25/60
188/289
(Continued)

FOREIGN PATENT DOCUMENTS

GB        552884 A     4/1943

OTHER PUBLICATIONS

International Search Report and Written Opinion for PCT application No. PCT/TR2022/050347, mailed Jun. 22, 2023.
(Continued)

*Primary Examiner* — Joshua J Michener
*Assistant Examiner* — Michael B. Kreiner
(74) *Attorney, Agent, or Firm* — Notaro, Michalos & Zaccaria P.C.

(57) ABSTRACT

A landing gear for an air and/or space vehicle has a body (G); at least one wheel (T) which enables the body (G) to move on the ground; at least one strut (2) located on the body (G); at least one opening (3) forming a space in cylindrical form substantially along the strut (2); a fluid (A) which is located in the opening (3) to provide damping; at least one damper (4) located between the strut (2) and the wheel (T) to move within the opening (3) and which compresses the fluid (A) to provide damping.

8 Claims, 4 Drawing Sheets

(56) References Cited

U.S. PATENT DOCUMENTS

| | | | | | |
|---|---|---|---|---|---|
| 2,461,066 | A | * | 2/1949 | Henry | B64C 25/60 280/481 |
| 2,608,403 | A | * | 8/1952 | Luther | B64C 25/60 138/147 |
| 3,027,122 | A | * | 3/1962 | Westcott, Jr. | B64C 25/10 244/103 R |
| 3,997,133 | A | * | 12/1976 | Fagan | B64C 25/60 244/100 R |
| 4,007,894 | A | * | 2/1977 | Hartel | B64C 25/60 244/104 FP |
| 4,126,212 | A | * | 11/1978 | Crawley | F16F 9/512 137/71 |
| 4,537,374 | A | * | 8/1985 | Barnoin | F16F 7/125 188/371 |
| 4,821,983 | A | * | 4/1989 | Aubry | F16F 9/348 267/64.23 |
| 5,100,083 | A | | 3/1992 | Large et al. | |
| 5,547,148 | A | * | 8/1996 | Del Monte | B64C 25/60 244/100 R |
| 6,328,259 | B1 | * | 12/2001 | Bolukbasi | B64C 25/60 188/371 |
| 11,391,340 | B2 | * | 7/2022 | Goldring | F16F 9/342 |

OTHER PUBLICATIONS

International Preliminary Report on Patentability, completed on Jun. 20, 2023.
Demand/Request for Preliminary Examination dated Feb. 16, 2023.
Written Opinion of the International Preliminary Examining Authority dated Mar. 17, 2023.
Response to Office Action dated May 10, 2023.
International Application Status Report generated on Sep. 13, 2023.

* cited by examiner

LANDING GEAR

The present invention relates to landing gear in air and/or space vehicles.

Landing gears are used in air and/or space vehicles, which provide structural connection between the body and the wheel, and enable the air and/or space vehicle to land safely on the ground and taxi on the ground. Air and/or space vehicles are exposed to high shock energies during their landing to the ground. The safe landing of the air and/or space vehicle on the ground is ensured by the strut structure provided in the landing gear, in which the damping is performed.

In the state of the art, the landing gear strut in air and/or space vehicles is produced as a single piece. An opening is provided in the landing gear strut. A damper compresses a fluid in the opening, so that the shock energy of the air and/or space vehicle can be absorbed. In order for the damper to act effectively on the opening provided in the strut, the surface roughness is reduced by grinding and honing the inner diameter of the strut along the opening.

The patent application document U.S. Pat. No. 2,156,117A is related to shock absorbers and more particularly to those of the strut type adapted for aviation landing gear. The invention has to do with the improved construction of a shock absorbing strut of the compressed air and hydraulic metering pin and orifice type which is adapted for heavy duty work and also operation in pairs. The structure is also such as to permit its ready installation or removal in a tubular strut socket of a plane to the end that repairs and Inspection may be readily made by removal thereof.

Thanks to a landing gear according to the present invention, the strut in the landing gear is produced as two separate parts and said two separate parts are removable.

Another object of the present invention is to reduce the production costs of the struts and reduce the possibility of scrapping the entire strut as a result of the error that may occur during the production of the strut, thanks to the fact that the damping part on the strut is produced as a separate part and surface treatments are applied only on the separate part.

Another object of the present invention is to provide ease of maintenance and repair thanks to the strut produced as separate parts.

The landing gear realized to achieve the object of the invention, which is defined in the first claim and other claims dependent thereon, comprises a body provided at air and/or space vehicles; at least one wheel which allows the body to move on the ground; at least one strut provided on the body; at least one opening forming a space in cylindrical geometry substantially along the strut; a fluid provided in the opening, which is compressed to provide damping against the shock effects; at least one damper provided between the strut and the wheel to move within the opening, which compresses the fluid to damp the shock effects.

The landing gear according to the invention comprises at least a first strut provided on the strut and allowing the structural connection of the strut with the body; at least a second strut provided on the strut and removably connected to the first strut; an opening provided on the first strut and the second strut to allow damping on the second strut; and a damper which is movable in the opening and serves to compress the fluid.

In an embodiment of the invention, the landing gear comprises a first strut and a second strut, which are engaged cylindrically such that they are almost partially within each other.

In an embodiment of the invention, the landing gear comprises at least a first strut flange which substantially encircles the first strut and extends outwardly from the first strut; at least a second strut flange which is provided on the second strut so as to be substantially opposite to the first strut flange and substantially enclose the second strut, and extends outwardly from the second strut; at least one female positioner provided as a recess and/or a protrusion on the first strut and/or the first strut flange; and at least one male positioner provided on the second strut or second strut flange, geometrically compatible with the female positioner, wherein if the female positioner is a recess, the male positioner becomes a protrusion, and vice versa.

In an embodiment of the invention, the landing gear comprises at least one fastener removably connected to the holes which are positioned to remain opposite each other after at least one hole on the first strut flange and at least one hole on the second strut flange are aligned to each other.

In an embodiment of the invention, the landing gear comprises a strut consisting of a first strut and a second strut, which are removably attached by, respectively, engaging the first strut and the second strut cylindrically such that they are almost partially within each other, attaching the opposing male positioner and female positioner to each other, and removably connecting the fasteners to the opposing holes.

In an embodiment of the invention, the landing gear comprises a female positioner with a rectangular, square, triangle, circular, semicircular, crescent or sawtooth geometry; and a male positioner, which is geometrically compatible with the female positioner so as to be conjugate and complement the female positioner.

In an embodiment of the invention, the landing gear comprises a female positioner and a male positioner, wherein the female positioner and the male positioner are provided to be substantially equally spaced from each other, wherein the male positioner is aligned face-to-face with the female positioner and is geometrically compatible with the female positioner so as to be conjugate and complement the female positioner.

In an embodiment of the invention, the landing gear comprises a first strut and a second strut, which are provided with external threads on the interlocking parts thereof; and at least one connecting piece with a hollow cylindrical geometry, which enables the first strut and the second strut to be removably attached since the internal thread provided on the inner surface thereof is attached to the external threads on the first strut and the second strut.

In an embodiment of the invention, the landing gear comprises a first strut and a second strut produced by using casting, turning and NC manufacturing methods.

In an embodiment of the invention, the landing gear comprises at least one engine compartment provided on the second strut to allow the engine to be mounted thereon, which allows the direction of the wheel to be changed.

In an embodiment of the invention, the landing gear comprises a second strut which enables the damper to act on the outer wall of the opening with reduced roughness, thanks to the application of grinding and honing surface treatments on the outer walls of the opening on its inner surface.

In an embodiment of the invention, the landing gear comprises a damper which is an oleo-pneumatic, pneumatic or hydraulic cylinder.

The landing gear realized to achieve the object of the present invention is illustrated in the attached drawings, in which.

Figure 1:
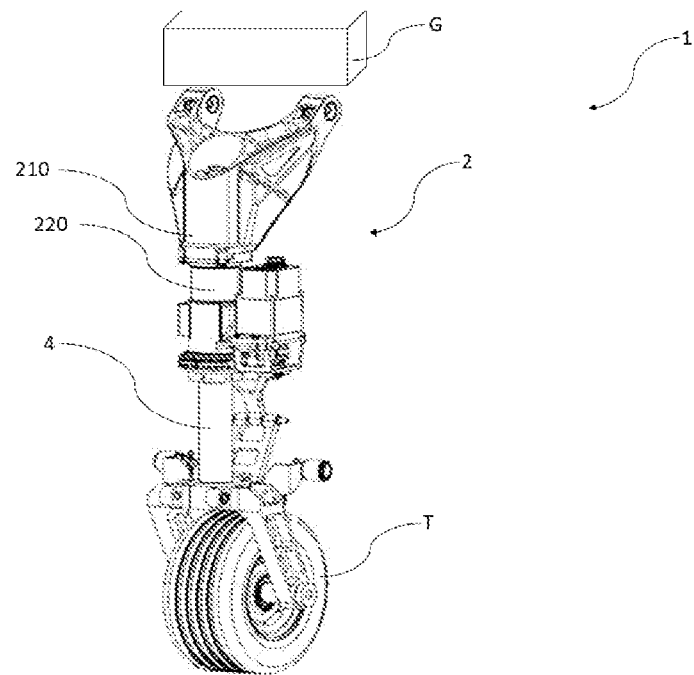
FIG. 1 is a perspective view of a landing gear.
Figure 7:
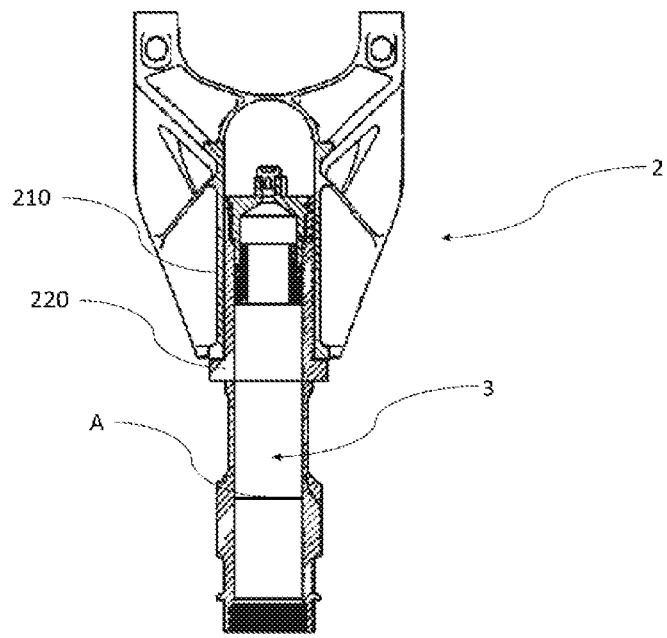
FIG. 7 is an A-A section view of a strut shown in FIG. 6.

All the parts illustrated in figures are individually assigned a reference numeral and the corresponding terms of these numbers are listed below:

1. Landing gear
2. Strut
   210. First strut
   211. First strut flange
   220. Second strut
   221. Second strut flange
3. Opening
4. Damper
5. Female positioner
6. Male positioner
7. Hole
8. Fastener
9. Connecting piece
10. Engine compartment
(G) Body
(T) Wheel
(A) Fluid The landing gear (1) comprises a body (G) provided at air and/or space vehicles; at least one wheel (T) which enables the body (G) to move on the ground; at least one strut (2) located on the body (G); at least one opening (3) forming a space in cylindrical form substantially along the strut (2); a fluid (A) which is located in the opening (3) to provide damping; at least one damper (4) located between the strut (2) and the wheel (T) to move within the opening (3), which compresses the fluid (A) to provide damping. (FIG. 1, FIG. 7).

The landing gear (1) according to the invention comprises at least a first strut (210) located on the strut (2) and providing the structural connection of the strut (2) with the body (G); at least a second strut (220) located on the strut (2) and removably attached to the first strut (210); an opening (3) located on the second strut (220); and a damper (4) which is movably located in the opening (3) (FIG. 1, FIG. 2, FIG. 3, FIG. 4, FIG. 5, FIG. 6, FIG. 7).

The body (G), which is located on the landing gear (1) and used in air and/or space vehicles, is connected to the wheel (T) by means of the landing gear consisting of the strut (2), the opening (3), the fluid (A) and the damper (4). The wheel (T) enable the body (G) to land safely on the ground and the body (G) to move on the ground. During the landing of the body (G) to the ground, the impact and/or shock effect on the body (G) is damped by the damper (4) compressing the fluid (A), and the body (G) can safely land on the ground. The strut (2) is designed and produced as a single piece. Since the strut (2) has many connection interfaces thereon, the risk of production errors that may occur during the production of the strut (2) increases, which may cause the entire strut (2) to be scrapped. In addition, grinding and honing surface treatments are applied on the entire inner surface of the strut (2) so that the fluid (A) can act effectively on the opening (3) on the strut (2). This causes high cost, time and labour for the strut (2) production. During the maintenance and/or repair of the strut (2), too much time and labour is required since the entire strut (2) piece has to be removed from the body (G). In cases where re-production of the entire strut (2) piece is required, high production costs creates a problem again (FIG. 1, FIG. 7).

The strut (2) is produced as two separate parts, the first strut (210) and the second strut (220). No surface treatment is required on the first strut (210), since the damping realized by the damper (4) compressing the fluid (A) in the opening (3) takes place only in the second strut (220), without need to take place in the first strut (210) with complex geometry. In addition, if an incorrect interior surface treatment is applied for the second strut (220), scrapping of the first strut (220) is also avoided. Similarly, scrapping of the second strut (220) is prevented due to a manufacturing error that may occur during the production of the first strut (210), which has a complex geometry. Thus, the cost, time and labour costs for the production of the strut (2) are reduced. In addition, in cases where the strut (2) is repaired and/or maintained, only the relevant part, which requires repair and/or maintenance, is removed from the first strut (210) or the second strut (220) without removing the entire strut (2) from the body (G), and easy and fast repair and maintenance operations are performed (FIG. 1, FIG. 2, FIG. 3, FIG. 4, FIG. 5, FIG. 6, FIG. 7).

In an embodiment of the invention, the landing gear (1) comprises a first strut (210) and a second strut (220) inserted into one another, at least partially nested within each other. The strut (2) consists of the first strut (210) and the second strut (220). Preferably, the second strut (220) partially engages with the first strut (210). Thus, for mounting the second strut (220) to the first strut (210), a first type of connection, cylindrical engaging, is provided, and the second strut (220) and the first strut (210) are engaged with each other cylindrically at their inner surfaces surrounding the opening (3) (FIG. 7).

In an embodiment of the invention, the landing gear (1) comprises at least a first strut flange (211) which is located to substantially encircle the first strut (210); at least a second strut flange (221) which is located on the second strut (220) so as to be substantially opposite to the first strut flange (211); at least one female positioner (5) located as a recess and/or a protrusion on the first strut (210) and/or the first strut flange (211); and at least one male positioner (6) located on the second strut (220) or second strut flange (221) and form-fitting with the female positioner (5) such that if the female positioner (5) is a recess, the male positioner (6) becomes a protrusion, and vice versa. Thanks to the form-fitting connection of the female positioner (5) and the male positioner (6), the wheel (T), the second strut (220), the first strut (210) and the body (G) are aligned. In addition, when the body (G) lands on the ground, the lateral loads and rotational moments acting on the wheel (T) can be transferred from the second strut (220) to the first strut (210) by means of the female positioner (5) and the male positioner (6), and therefore, the use of large and/or extra parts that may cause potential weight is prevented (FIG. 2, FIG. 3, FIG. 4, FIG. 5, FIG. 6).

Figure 3:
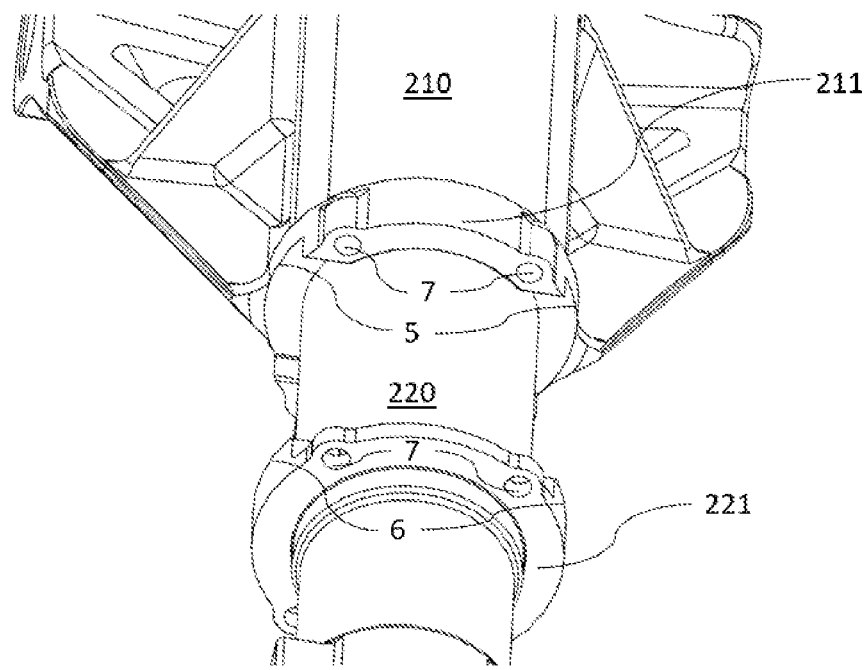
FIG. 3 is a perspective view of a strut.
Figure 4:
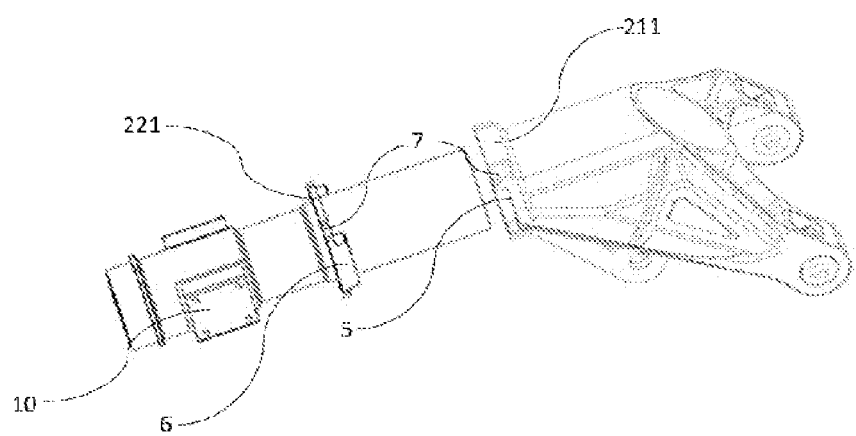
FIG. 4 is a perspective view of a strut.
Figure 5:
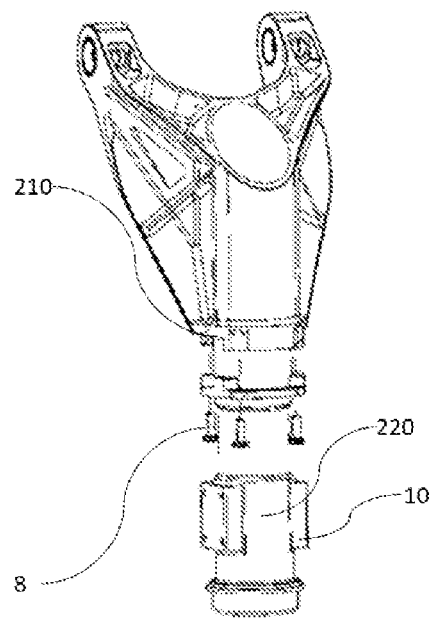
FIG. 5 is an exploded assembly view of a strut.
Figure 6:
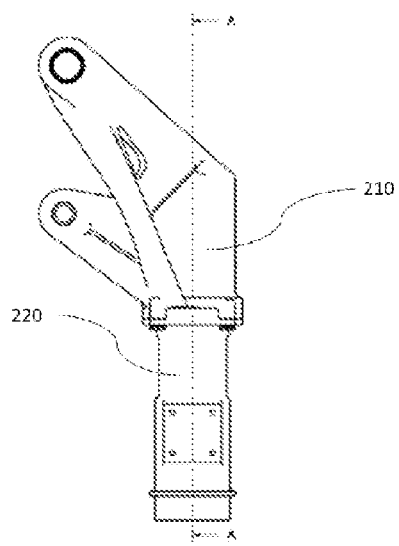
FIG. 6 is a side view of a strut.

In an embodiment of the invention, the landing gear (1) comprises a plurality of holes (7) located on the first strut flange (211) and the second strut flange (221) so as to form opposing spaces with each other; and at least one fastener (8) removably attached to the opposing holes (7). The fasteners (8) enable the second strut (220) and the first strut (210) to be removably attached to each other (FIG. 3, FIG. 4, FIG. 5).

In an embodiment of the invention, the landing gear (1) comprises a strut (2) consisting of a first strut (210) and a second strut (220), which are removably mounted by, respectively, engaging the first strut (210) and the second strut (220) such that they are located almost partially within each other, engaging the opposing female positioner (5) and male positioner (6) to each other, and removably attaching the fasteners (8) to the opposing holes (7). Thus, the second strut (220) is removably attached to the first strut (210) easily and quickly (FIG. 1, FIG. 2, FIG. 3, FIG. 4, FIG. 5, FIG. 6, FIG. 7).

In an embodiment of the invention, the landing gear (1) comprises a female positioner (5) with a rectangular, square, triangular, circular, semicircular, crescent or sawtooth form; and a male positioner (6) form-fitting with the female positioner (5). In the design of the landing gear (1), an optimum form for the female positioner (5) and the male positioner (6) form-fitting with the female positioner (5) is determined according to the forces and moments acting on the wheel (T). Thus, the forces and moments acting on the wheel (T) are effectively transferred via the female positioner (5) and the male positioner (6) (FIG. 3, FIG. 4, FIG. 5).

Figure 2:
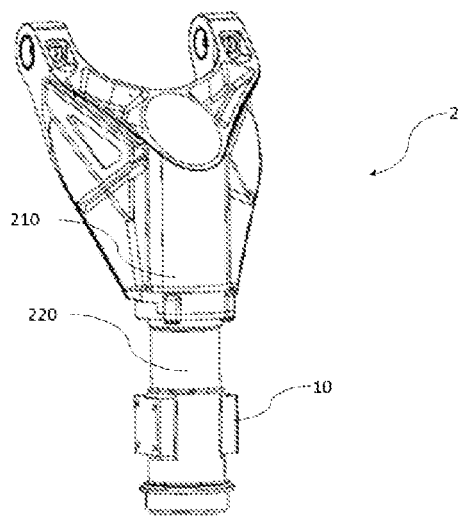
FIG. 2 is a perspective view of a strut.

In an embodiment of the invention, the landing gear (1) comprises a female positioner (5) and a male positioner (6), wherein the female positioner (5) and the male positioner (6) are located to be substantially equally spaced from each other, wherein the male positioner (6) is located opposite to the female positioner (5) in a form-fitting manner. The fact that the female positioner (5) and the male positioner (6) are equally spaced ensures that the maximum stress acting on the first strut (210) and the second strut (220) is reduced (FIG. 2, FIG. 3, FIG. 4).

Figure 8:
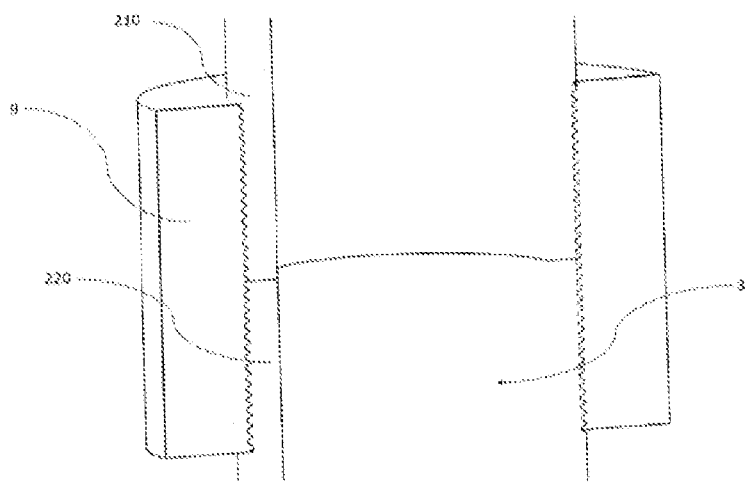
FIG. 8 is a cross-sectional view of another alternative embodiment of a strut.

In an embodiment of the invention, the landing gear (1) comprises a first strut (210) and a second strut (220), which are provided with external threads on the interlocking parts thereof; and at least one connecting piece (9) in a hollow cylindrical form, which allows the first strut (210) and the second strut (220) to be removably attached since the internal thread provided on the inner surface thereof is attached to the external threads on the first strut (210) and the second strut (220). The connecting piece (9), the body (G) and the wheel (T) enable the first strut (210) and the second strut (220) to be removably connected to each other. Channeled spiral spaces are provided in the connecting piece (9), so that the first strut (210) and the second strut (220) are removably mounted with each other so as to be aligned (FIG. 1, FIG. 8).

In an embodiment of the invention, the landing gear (1) comprises a first strut (210) and a second strut (220) produced by using casting, turning and NC manufacturing methods (FIG. 1).

In an embodiment of the invention, the landing gear (1) comprises at least one engine compartment (10) located on the second strut (220), which allows the engine to be mounted thereon, wherein the engine enables the direction of the wheel (T) to be changed. A servo motor is connected to the engine compartment (10), which enables the direction of the wheel (T) to be changed (FIG. 1, FIG. 5).

In an embodiment of the invention, the landing gear (1) comprises a second strut (220) which enables the damper (4) to work on the surface with reduced roughness, thanks to the application of grinding and honing surface treatments on its inner surface. Since there is no damping in the first strut (210), there is no need to apply surface treatment to the first strut (210), and grinding and honing surface treatments are applied only to the second strut (220). Thus, surface treatment costs, labour and time are reduced (FIG. 1, FIG. 7).

In an embodiment of the invention, the landing gear (1) comprises a damper (4) which is an oleo-pneumatic, pneumatic or hydraulic cylinder (FIG. 1, FIG. 7).

The invention claimed is:

1. A landing gear (1) comprising:
   a body (G) provided on an air and/or space vehicle;
   a wheel (T) which enables the body (G) to move on the ground;
   a strut (2) located on the body (G), the strut comprising a first strut element (210) and a second strut element (220), the first strut element (210) providing the structural connection of the strut (2) with the body (G), and the second strut element (220) being removably attached to the first strut element (210);
   an opening (3) forming a space in cylindrical form substantially along the strut (2);
   a fluid (A) which is located in the opening (3) to provide damping;
   a damper (4) located between the strut (2) and the wheel (T) to move within the opening (3), which compresses the fluid (A) to provide damping;
   a first strut element flange (211) which is located to substantially encircle the first strut element (210);
   a second strut element flange (221) which is located on the second strut element (220) so as to be substantially opposite to the first strut element flange (211);
   a plurality of holes (7) located on the first strut element flange (211) and the second strut element flange (221) so as to form opposing spaces with each other;
   at least one fastener (8) removably attached to the opposing holes (7);
   a female positioner (5) with a rectangular form, located as a recess and/or a protrusion on the first strut element (210) or the first strut element flange (211);
   a male positioner (6) located on the second strut element (220) or the second strut element flange (221) and form-fitting with the female positioner (5) such that if the female positioner (5) is a recess, the male positioner (6) becomes a protrusion, and vice versa; and
   wherein the female positioner (5) and the male positioner (6) are located to be substantially equally spaced from each other, and wherein optimum form for the female positioner (5) and the male positioner (6) are determined according to the forces and moments acting on the wheel (T).

2. The landing gear (1) according to claim 1, wherein the first strut element (210) and the second strut element (220) are inserted into one another, and at least partially nested within each other.

3. The landing gear (1) according to claim 1, wherein the strut (2) consists of the first strut element (210) and the second strut element (220), which are removably mounted by, respectively, engaging the first strut element (210) and the second strut element (220) such that they are located almost partially within each other, engaging the opposing female positioner (5) and male positioner (6) to each other, and removably attaching the fasteners (8) to the opposing holes (7).

4. The landing gear (1) according to claim 1, wherein the first strut element (210) and the second strut element (220) are provided with external threads on the interlocking parts thereof; and
   further comprising a connecting piece (9) in a hollow cylindrical form, which allows the first strut element (210) and the second strut element (220) to be removably attached since the internal thread provided on the inner surface thereof is attached to the external threads on the first strut element (210) and the second strut element (220).

5. The landing gear (1) according to claim 1, wherein the first strut element (210) and the second strut element (220) are produced by using casting, turning and NC manufacturing methods.

6. The landing gear (1) according to claim 1, further comprising at least one engine compartment (10) located on the second strut element (220) which allows an engine to be mounted thereon, wherein the engine enables the direction of the wheel (T) to be changed.

7. The landing gear (1) according to claim 1, wherein the inner surface of second strut element (220) has reduced roughness based on an application of grinding and honing surface treatments, which enables the damper (4) to work on the inner surface.

8. The landing gear (1) according to claim 1, wherein the damper (4) is an oleo-pneumatic, pneumatic or hydraulic cylinder.

* * * * *